(12) United States Patent
Davoli et al.

(10) Patent No.: US 12,415,300 B2
(45) Date of Patent: Sep. 16, 2025

(54) FOAMING MIXTURE DISPENSING APPARATUS AND METHOD

(71) Applicant: Dow Global Technologies LLC, Midland, MI (US)

(72) Inventors: Giacomo Davoli, Correggio (IT); Roberto Rossi, Correggio (IT); Mirella Coroneo, Correggio (IT)

(73) Assignee: Dow Global Technologies LLC, Midland, MI (US)

( * ) Notice: Subject to any disclaimer, the term of this patent is extended or adjusted under 35 U.S.C. 154(b) by 288 days.

(21) Appl. No.: 17/758,191

(22) PCT Filed: Mar. 23, 2021

(86) PCT No.: PCT/US2021/023570
§ 371 (c)(1),
(2) Date: Jun. 29, 2022

(87) PCT Pub. No.: WO2021/195014
PCT Pub. Date: Sep. 30, 2021

(65) Prior Publication Data
US 2023/0032144 A1 Feb. 2, 2023

(30) Foreign Application Priority Data
Mar. 26, 2020 (IT) .......... 102020000006445

(51) Int. Cl.
*B29C 44/46* (2006.01)
*B29C 44/32* (2006.01)
(Continued)

(52) U.S. Cl.
CPC ............ *B29C 44/461* (2013.01); *B29C 44/32* (2013.01); *F16L 59/028* (2013.01); *F16L 59/04* (2013.01);
(Continued)

(58) Field of Classification Search
CPC .................. B29C 44/461; B29C 44/32
See application file for complete search history.

(56) References Cited

U.S. PATENT DOCUMENTS 1,252,821 A * 1/1918 Lewis .......... B29C 48/07
100/909
4,746,283 A * 5/1988 Hobson .......... B29C 48/09
264/209.8
(Continued)

FOREIGN PATENT DOCUMENTS

CN          106426721 A      2/2017
DE       202009015838 U1    2/2010
(Continued)

OTHER PUBLICATIONS

Machine translation CN106426721A (Year: 2917).*
Machine translation JP2006142125A (Year: 2006).*

*Primary Examiner* — Jacob T Minskey
*Assistant Examiner* — Wayne K. Swier (57) ABSTRACT

An adjustable distributor apparatus (10) for dispensing a foam forming mixture comprising a main body (20) and adjustment plate, the main body featuring at least one inlet, one channel, and one outlet, the inlet, channel and outlet in fluid connection such that a fluid may pass through the inlet into the channel and exit from the channel through the outlet, and the outlet being coupled with at least one adjustment plate (40), the adjustment plate featuring at least a first face, a second face opposing the first face, and an outlet hole, enabling a seal between either the outlet of the main body or the second face of a second adjustment plate, and the outlet hole extending from the first face to the second face by way of a fluid connection through the adjustment plate.

9 Claims, 10 Drawing Sheets

(51) Int. Cl.
 *B29K 75/00* (2006.01)
 *B29L 7/00* (2006.01)
 *B29L 9/00* (2006.01)
 *F16L 59/02* (2006.01)
 *F16L 59/04* (2006.01)

(52) U.S. Cl.
 CPC ..... *B29K 2075/00* (2013.01); *B29L 2007/002* (2013.01); *B29L 2009/00* (2013.01)

(56) References Cited

U.S. PATENT DOCUMENTS

| | | |
|---|---|---|
| 8,852,691 B2 | 10/2014 | Schoen et al. |
| 9,718,223 B2 | 8/2017 | Koster |
| 2002/0153428 A1 | 10/2002 | Koveal et al. |
| 2010/0080900 A1 | 4/2010 | Geraedts et al. |
| 2014/0342089 A1 | 11/2014 | Koster et al. |
| 2014/0342090 A1 | 11/2014 | Koster |
| 2016/0075073 A1 | 3/2016 | Womer |
| 2017/0285619 A1 | 10/2017 | Brennan |

FOREIGN PATENT DOCUMENTS

| | | | |
|---|---|---|---|
| JP | 2006142125 A | 6/2006 | |
| WO | 2010059478 A2 | 5/2010 | |
| WO | WO-2018073180 A1 * | 4/2018 | ............. F28D 9/005 |

* cited by examiner

FOAMING MIXTURE DISPENSING APPARATUS AND METHOD

Embodiments relate to a new apparatus and method for dispensing foaming reactive mixtures. More specifically, the embodiments relate to an adjustable apparatus and method for dispensing foaming reactive mixtures upon a substrate for production of insulation panels.

INTRODUCTION

Insulation panels, such as sandwich panels or foam boards, are used in the building and construction industry, appliances, liquid storage, gas storage, transportation tanks for liquids and/or gases, and the like. They are composed of at least one rigid polyurethane (PUR) and/or polyisocyanurate (PIR) core and are commonly produced through a continuous manufacturing process. Some examples of such a process include rigid faced double belt lamination (RF-DBL) or flexible face double belt lamination (FF-DBL). These processes normally consist of inline mixing of a formulated polyol blend through metering equipment with catalysts, additives, nucleation air and a blowing agent. This resulting isocyanate-reactive mixture is then combined with isocyanate in a mixing chamber. The reactive mixture then flows out of the mixing chamber and is distributed onto a moving sheet (bottom surface) positioned below the mixing chamber. The reactive mixture then increases in volume (foaming) filling the volume between the bottom and the top sheet. The sheets may be made of metal, plastic, paper, or any other material capable of acting as a substrate for the growing foam. The foam formed by the reactive mixtures then cures in a designated curing section, that may be a long (8+ meters) double-belt conveyor system with side blocks. In this section, the foam becomes stiff and obtains a regular shape thanks to the presence of the double-belt conveyor and side blocks. Foam panels made in this way can then conveniently be cut to a desired length.

In this process, the distribution of the reactive mixture on the bottom substrate (metal, paper, paper covered by fiber glass, etc.) is of paramount importance. This is because the amount of reactive mixture (and thus the resulting expanded foam) should be laid down evenly to ensure a uniform foam growth. Uniform foam growth results in the homogeneous distribution of material in a given insulation panel and, consequently, in homogeneous mechanical performance of the panel itself during its working life.

A piece of technology currently present in the market for such production is a rake (also referred to as a poker) with a central channel and outlet tubes of different lengths. The geometry of these rakes is designed to distribute the reactive mixture uniformly for a given flow rate and viscosity. Ideally, different rakes would be designed for the most common mixtures to accommodate a range of different flow rates and viscosities as these distributors will only function properly under one specific set of conditions. However, constant innovation of foaming mixtures requires a re-design of the rakes and/or distributors each time a new foaming mixture is devised which is prohibitively time consuming and expensive.

Additionally, this same re-design of the pokers may also be required if the processing conditions for a certain reactive mixture vary during the production run itself. This is because each polyurethane reactive mixture may have very different viscosities and shear thinning behavior depending on various factors, these factors being variable even during a single production run. As mentioned previously, the process for optimizing each specific rake and distributor for each specific application (new or not) is very time consuming and costly. This is due in no short part to the non-Newtonian behavior of these mixtures which makes it difficult to calculate the best combination of diameters and lengths of the channels for a given distributor and/or rake.

For all these reasons and more, there is a need for an adjustable apparatus and method for dispensing foaming mixtures upon a substrate.

SUMMARY

Embodiments relate to an apparatus and method for production of insulation panels and boards through double band lamination, comprising: passing a reactive fluid mixture through a main body and adjustment plates, the main body featuring at least one inlet, one channel, and one outlet, the inlet, channel and outlet being connected such that the reactive fluid mixture may pass through the inlet into the channel and exit the channel through the outlet, wherein the outlet is coupled with at least one adjustment plate, the adjustment plate featuring at least a top face, bottom face, and outlet hole, wherein the top face may feature a raised portion and the bottom face features a relieved portion, the raised portion enabling a seal to be formed between either the outlet of the main body or the bottom face of a second adjustment plate, and the outlet hole extending from the top face to the bottom face enabling the fluid to pass through the adjustment plate.

BRIEF DESCRIPTION OF THE DRAWINGS

Various embodiments are disclosed in the following detailed description and accompanying drawings.

DETAILED DESCRIPTION

Embodiments relate to an apparatus and method for applying a foam forming reactive mixture used to form polyurethane (PUR) and/or polyisocyanurate (PIR) foams in sandwich insulation panels, which allows for customization in order to optimize uniformity of the resultant foam layer(s) across the panels. The apparatus is an adjustable distributor 10. The method includes adjustment of the adjustable distributor 10 for customization and use of the adjustable distributor 10 to make an insulation panel which can be used for the construction industry, appliances, transportation tanks, and the like (e.g., in a continuous lamination manufacturing process such as rigid faced double belt lamination or flexible faced double belt lamination).

Figure 1:
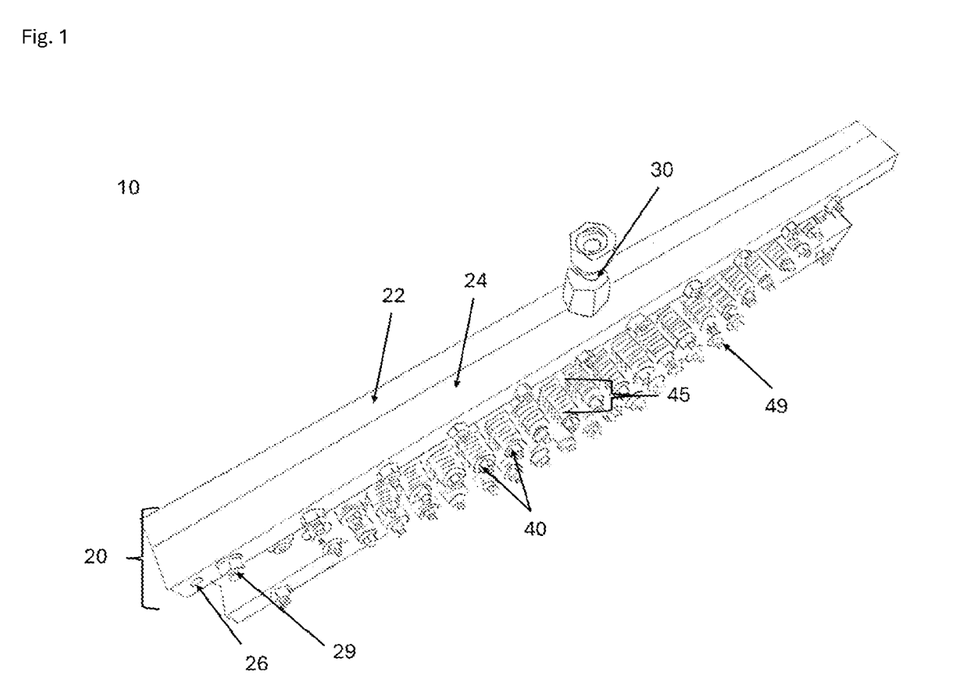
FIG. 1 is a perspective view of an adjustable distributor.

FIG. 1 is a perspective view of the adjustable distributor 10 on its side. As shown in FIG. 1, the adjustable distributor 10 may feature a main body 20 and one or more adjustment plates 40. The main body 20, in one embodiment, may have a length similar to a width of the insulation panel to be made, such as from 100 mm to 2,000 mm, so as to allow for distribution of the foam forming mixture across a width of the insulation panel. The length of the body 20 may also be a fraction of the length of a panel to be produced so that multiple distributors 10 may be coupled to span the length of a panel to be produced. For example, the main body 20, in one embodiment, is rectangular in shape, made from a metal such as aluminum, and has the dimensions of 523× 100×56 mm (length×width×depth). The main body 20 may feature a clam shell, two-piece design with a top body portion 22 and bottom body portion 24 coupled together via the main body connection points 26. In this example, the main body connection points 26 are threaded holes which enable a body connector 29 to form a sealed connection between the two body portions 22 and 24. When connected the main body 20 forms an inlet 30 which enables a reactive mixture (e.g., the foam forming reactive mixture) to flow into the main body 20. Once the reactive mixture 105 enters the main body 20, it flows throughout the body 20 via one or more channels 32 (see FIG. 4B) and exits the body via one or more outlets 34 (see FIG. 4B). In this embodiment the inlet 30 is located on one side of the main body 20, however the inlet may be located anywhere on the body 20 as needed.

The adjustment plates 40, in this embodiment, are positioned below the outlets 34 and form connections with the outlets 34 and other plates 40 thus forming an outlet tube 50 for pouring the reactive mixture (see FIG. 8) within the interior of the plates 40. As the plates can be coupled with one another to form an elongated plate stack 45 of plates 40, the length of the outlet tube 50 can be readily adjusted to customize and/or ensure consistent flow from each outlet 34, through the outlet tube 50, and then on to a substrate. In this example, the plates 40, assembled into plate stacks 45 are connected to the main body 20 via the plate connection points 26 (see FIGS. 4A and 4B) and held to the body by at least a plate connector. The number of plates 40 in each plate stack 45 may be varied by the location of the plate stack 45 along the body 20. For example, each plate stack 45 may have from 1 to 100 individual plates 40, with exemplary embodiments containing 1 to 25 plates 40. The number of plates 40 in each plate stack 45 may be varied in a pattern along the main body 20, e.g., with more plates 40 being present near the inlet 30 and less plates 40 being present far away from the inlet 30. For example, the number of plates 40 may gradually decrease (such as by 1-5 plates) from near the center to the lateral ends. In another embodiment, the number of plates 40 in each plate stack 45 may be randomly varied along the main body 20, such that the number of plates 40 is customized to adjust flow out of each individual outlet tube 50.

The main body 20, also referred to as a rake, may have a length between 200-2,100 mm in one embodiment, from 400-750 mm in another embodiment; and from 450-550 mm in still yet another embodiment. The channel 32 may have an approximate diameter of 5-50 mm, with an exemplary embodiment having a diameter of 9-14 mm. This channel 32 diameter may also potentially taper and/or widen along the length of the body 20. In this example, there are twenty-four equidistantly spaced outlets 34 which connect to the channel 32 along the body 20. The length between the two furthest outlets 34 being 504 mm.

It should also be noted that, in this example, the outlets 34 extend through the bottom of the main body 20 which is approximately 10 mm thick meaning each outlet 34 features at least an outlet tube 50 of around 10 mm before any adjustment plates 40 are added. The outlet tubes 50, comprised of the outlet 34 and interior of the adjustment plates 40 may vary in length with preferred embodiments featuring outlet tube 50 lengths of 0-100 mm and a diameter of 1-10 mm.

The body 20 in this example has been machined, but the components of the present invention may also be forged, 3D printed, or assembled in any manner which best provides a functional apparatus.

Figure 2:
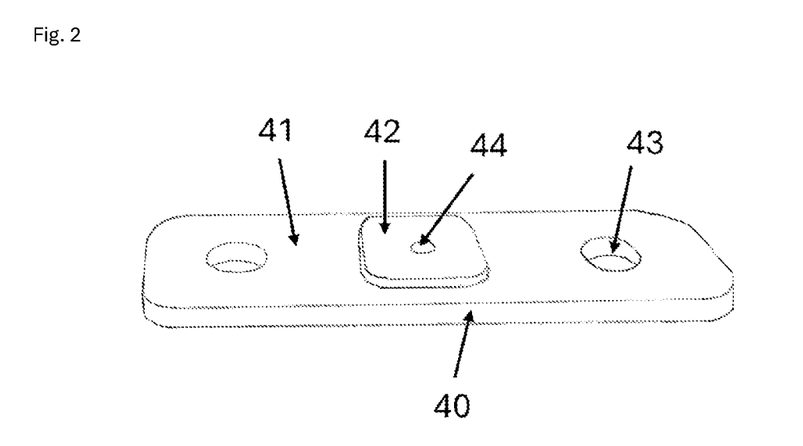
FIG. 2 is a perspective view of the top an adjustment plate.

FIG. 2 is a perspective view of the top an adjustment plate 40. The adjustment plate 40 may have a length appropriate for placement on the body 20. The depth of the adjustment plate may be from 0.5-20 mm to allow for appropriate customization. As shown in FIG. 2, the adjustment plate 40 in this embodiment is rectangular in shape with rounded corners, made from a thermoplastic material such as reinforced polyamide, and is approximately 55×18×2 mm (length×width×depth). The top face 41 of the adjustment plate 40 features a raised portion 42 relative to the top face 41, connector hole(s) 43, and an outlet hole 44. The outlet hole 44 enables a reactive mixture to flow through the interior of the plate 40. The raised portion 42 is square in shape with rounded corners in this example, and is proportioned to enable the raised portion 42 to fit into either an outlet 34 of the main body 20 (see FIGS. 4A and 4B) or a relieved or recessed portion 48 on the bottom face 47 of another adjustment plate 40 (see FIG. 3). The area around the outlet 34 on the main body 20 may also feature a body relieved portion 36 like that found on the adjustment plates 40 to ensure a seal between the plate 40 and main body 20 (see FIG. 5). In this way—the flow of a reactive mixture can be controlled by adjusting the number of plates 40 connected to a given outlet 34.

When a stack 45 of plates 40 (see FIG. 1 and FIG. 8) is assembled, the reactive mixture flows through the interior of the plate stack 45, forming an outlet tube 50 the length of which can be adjusted by adding or removing plates 40. In the case that a single plate 40 is used, the outlet hole 44 on this single plate 40 would also form the entire outlet tube 50.

The plates 40, while presented in this embodiment as having a single uniform thickness and shape, do not need to. It is fully envisioned in some applications that the shape and the thickness of the plates 40 will be varied as needed, in order to obtain optimal results, aid in quick adjustment, etc. The adjustment plates 40 may be of any functionally useful shape, including but not limited to: rectangular, circular, oval, square, oblong, diamond, or triangular in shape. The edges and/or corners of these shapes may be rounded or otherwise formed and altered as need to optimize performance. It is also fully envisioned that the plates 40 may be constructed, milled, forged, or 3D printed from metal, a thermoplastic polymer, or any other functionally capable material.

Figure 3:
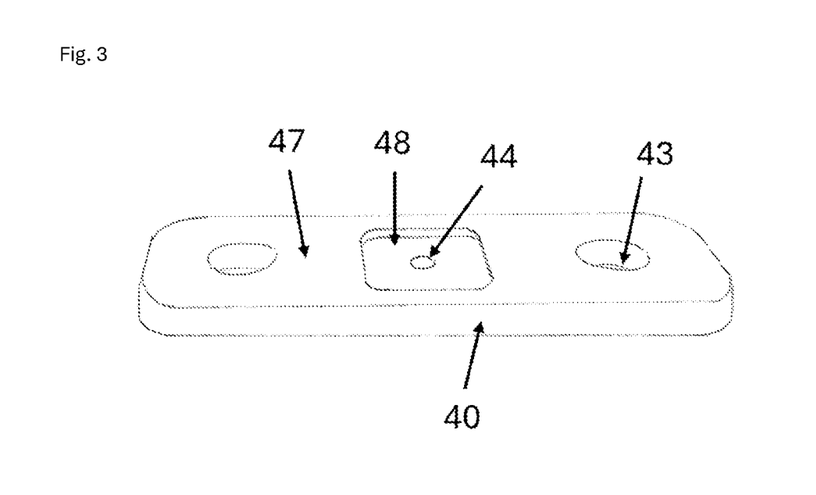
FIG. 3 is a perspective view of the bottom of an adjustment plate.

FIG. 3 is a perspective view of the bottom of an adjustment plate 40. As shown in FIG. 3 the adjustment plate 40 features a relieved portion 48 (this portion may also be described as sunken, depressed, recessed, etc.) relative to the bottom face 47 of the plate 40. This relieved portion 48 enables another adjustment plate 40 to be interlocked or positioned such that a seal is formed between the two plates 40. The seal enables the outlet holes 44 to form an outlet tube 50 through which a reactive mixture may flow. The outlet holes 44 extend through the entire thickness of the plates 40 and the diameter of the outlet holes 44 may be uniform or varied to help better control the rate and consistency of the flow of foaming mixture through the apparatus.

The plates 40 may be interlocking via the raised 42 and relieved 48 portions and may also utilize the connector hole(s) 43 to facilitate or improve the connection and seal formed between plates 40 and between the plates 40 and the outlets 34.

Figure 4A:
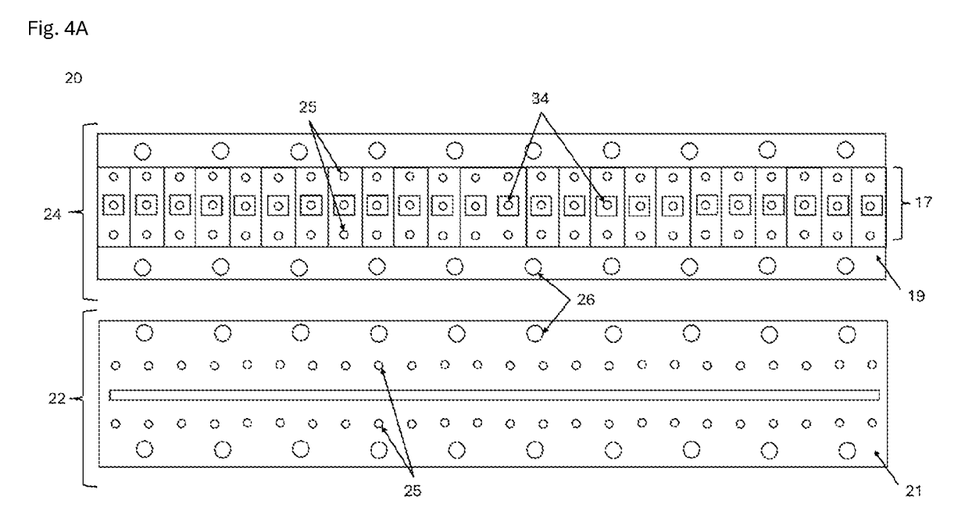
FIG. 4A is a top down view of the exterior of a main distributor body.

FIG. 4A is a top down view of the exterior of a main distributor body 20 with the top body portion 22 and bottom body portion 24 separated. As shown in FIG. 4A, the top body portion 22 features a top surface 21 and bottom surface 23 (see FIG. 4B). The top body top surface 21 is flat with a series of equidistant holes drilled though the top body portion 22. These holes serve to connect the top body portion 22 and bottom body portion 24 via body connector 29 (and the connection point 26) and also enable the adjustment plates 40 to be securely fastened to the main body 20 via the plate fastening holes 25 (and the plate connectors).

These plate fastening holes 25 and the connection points 26 can also be found on the top and bottom body portion 24 and serve the same purpose. The bottom body portion 24 features both a top surface 18 (see FIG. 4A) and bottom surface 19. Unlike the top body top surface 21, the bottom body bottom surface 19 is U-shaped with a shallow portion 17 which can accommodate adjustment plates 40. This shallow portion 17 contains both the plate fastening holes 25 and outlets 34.

Figure 4B:
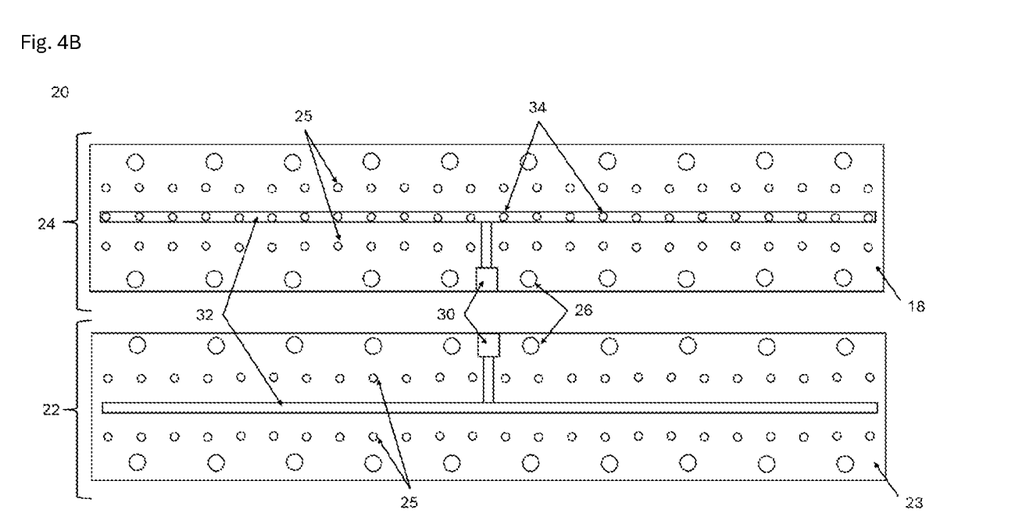
FIG. 4B is a top down view of the interior of a main distributor body.

FIG. 4B is a top down view of the interior of a main distributor body 20 with the top body portion 22 and bottom body portion 24 separated. As shown in FIG. 4B, this embodiment of the main distributor body 20 features a break-apart design which allows the distributor 20 to be easily cleaned and maintained. The interior of the main body 20 is formed by the top body portion's 22 bottom surface 23 and bottom body portion's 24 top surface 18. These two surfaces are flat and when secured together form a seal which enables a reactive mixture to flow through the body 20.

The top body portion 22 and bottom body portion 24 are sealed together, in this embodiment, via the connection points 26 which enable the body connectors 29 (in this example bolts, nuts and washers) to be tightened and provide a watertight, fluid-tight, foam-tight, or even airtight seal depending on the demands of a given application. Once the two body portions are secured together—they form both an inlet 30 and channel 32. The inlet and channel are formed by relieved portions found in the top body portion's 22 bottom surface 23 and bottom body portion's 24 a top surface 18. The bottom body portion's 24 a top surface 18 also contains outlets 34 which sit within the portion of the channel 32 formed by the bottom body top surface 18. These outlets 34 are holes which extend through the entire bottom body portion 24 and are where the foaming mixture exits the main distributor body 20.

The inlet 30 in this example features threading which enables tubing, hosing, etc. to be securely fastened to the distributor body 20 and for pressurized fluids to be pumped or otherwise moved (flowed) through the body 20. The channel 32 extends along the majority of the length of the interior of the main body 20 and provides a path for the reactive fluid to move from the inlet 30 to the outlets 34. The outlets 34 in this embodiment may be square in shape such that the adjustment plates 40 may be interlocked directly with the outlets 34 (or the relieved area 36 around the outlets 34, see FIG. 5), with the adjustment plates 40 being further secured by the plate fastening holes 25 in conjunction with the plate connectors (in this example bolts, nuts, and washers). The plate fastening holes 25 function similarly to the connection points 26 allowing the adjustment plates 40 to be tightly (airtight, watertight, etc.) secured to the outlets 34 and thus the main body 20. The position of these attachment points (plate fastening holes 25 and/or connection points 26) can be varied to best suit the needs of a given application of the present invention with corresponding holes on the adjustment plates 40 and other components also being varied to match such changes.

Figure 5:
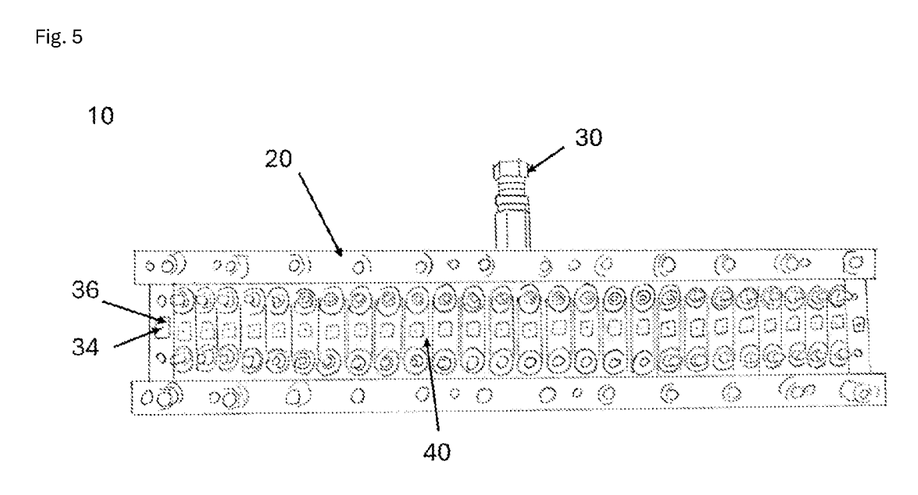
FIG. 5 is a bottom up view of a distributor.

FIG. 5 is a bottom up view of a distributor 10. As shown in FIG. 5, a fully assembled distributor 10 may feature adjustment plates 40 connected to the main distributor body 20 via the plate connectors with the main body 20 held together via the body connectors 29. Also shown in FIG. 5 is a body relieved portion 36 found around the outlets 34 which can accommodate the raised portion 42 of an adjustment plate 40 to form a secure, interlocking seal.

Figure 6:
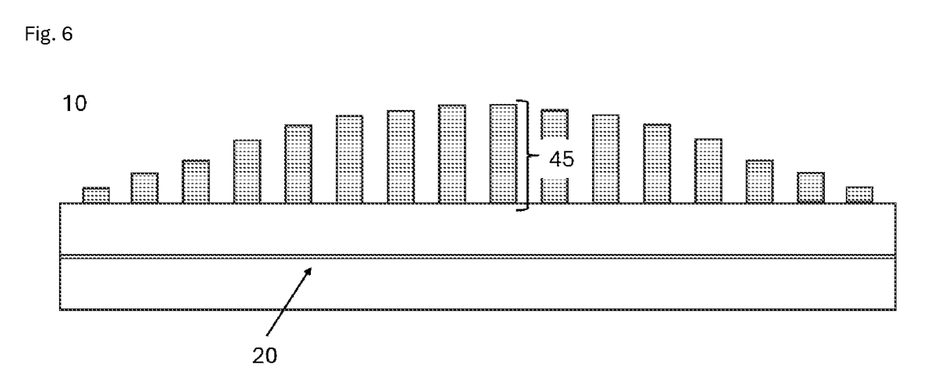
FIG. 6 is a side view of an upside-down distributor.

FIG. 6 is a side view of an upside-down distributor 10. As shown in FIG. 6, adjustment plate stacks 45 or a single adjustment plate 40 may be attached to the main distributor body 20 and the height of each of these stacks may vary. These varying stack 45 heights enable the flow of reactive mixtures to be regulated. The flow of reactive mixture enters the stacks 45 from the outlets 34 and passes through the interior of the plates 40 (e.g., the outlet holes 44) which form the outlet tubes 50 (see FIG. 8). The varying length and/or diameter of the outlet tubes 50 can control the flow rate of mixture and/or minimize the formation of surface bubbles in the foam once it expands on the substrate.

Figure 7:
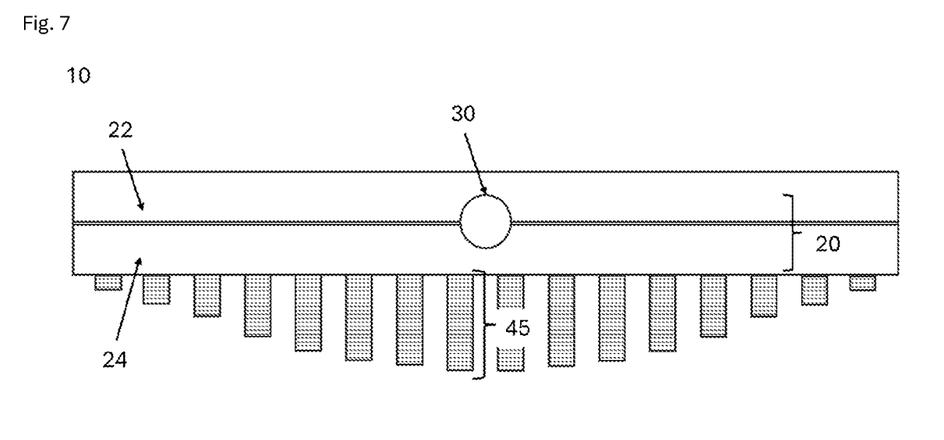
FIG. 7 is a front view of a distributor.

FIG. 7 is a front view of a distributor 10. As shown in FIG. 7, the series of adjustment plate stacks 45 hang below the main body 20 and extrude the foaming mixture(s) downwards onto a substrate. The inlet 30 is positioned at or around the meeting point of the top body portion 22 and bottom body portion 24—the meeting and connection of these two body portions forming the inlet 30. Any type of spigot, tap, etc. may be connected to the inlet to enable the flow of fluid into the distributor 10.

Figure 8:
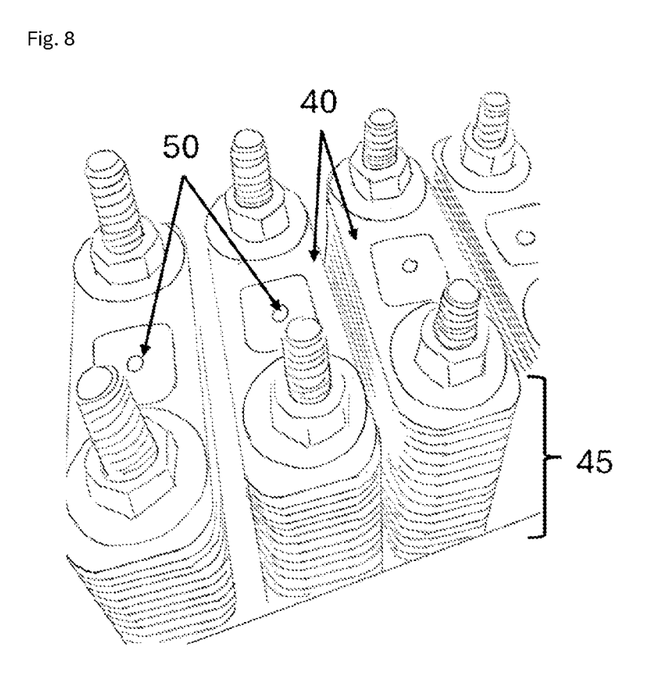
FIG. 8 is a close-up view of an upside-down distributor.

FIG. 8 is a close-up view of an upside-down distributor 10. As shown in FIG. 8, each adjustment plate stack 45 is made up of individual adjustment plates 40 interlocked with one another in vertical columns. These columns form outlet tubes 50, through which a foaming mixture may flow and exit the distributor 10 via the outlet holes 44 of the final adjustment plate 40 in each given stack 45. In some cases, it may be preferable to use no adjustment plates 40 in conjunction with one or more other the outlets 34, in which case the mixture flowing through the distributor 10 will exit the outlet(s) 34 directly on to the substrate below.

Figure 9:
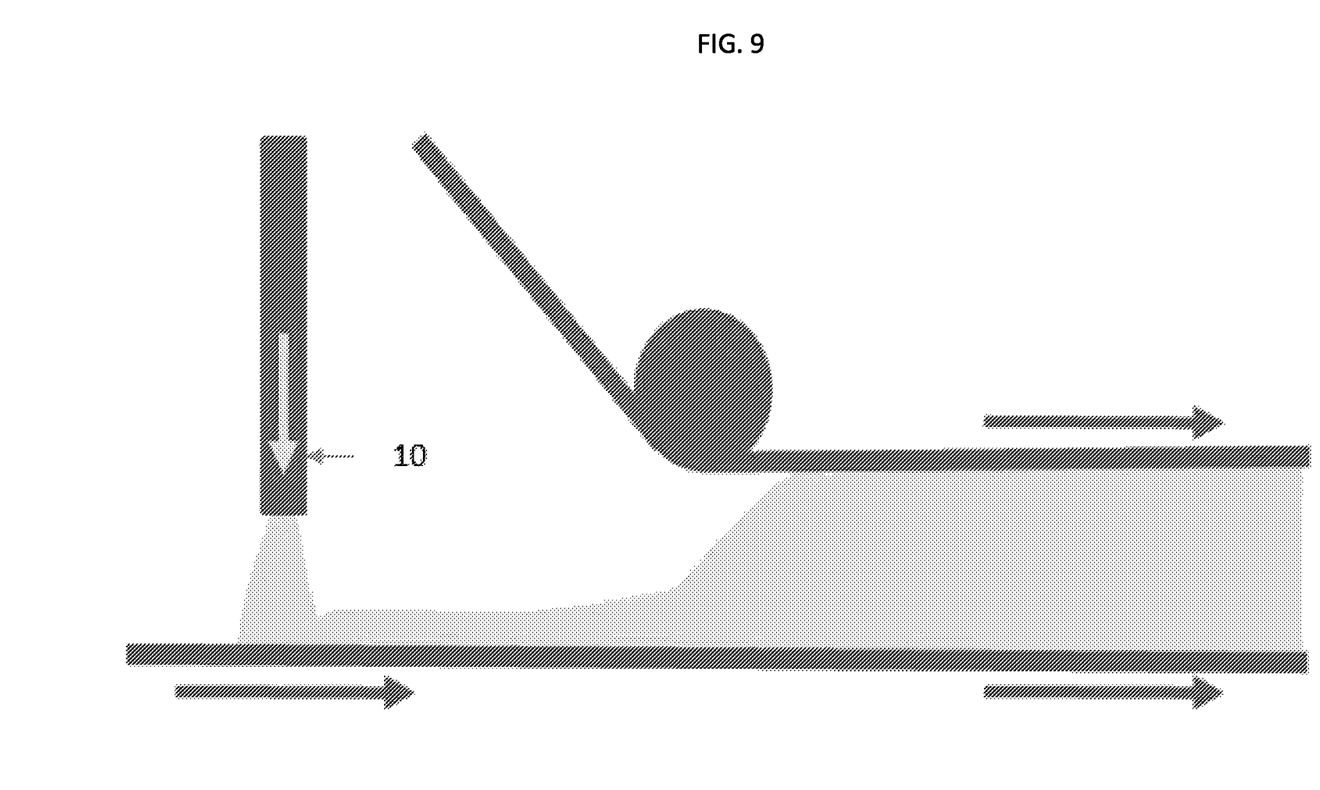
FIG. 9 is a diagram which depicts the double band lamentation process.

FIG. 9 is a diagram which depicts the double band lamentation process. As shown in FIG. 9, the distributor 10 is placed so that as fluid passes through it, the fluid is directed downward on to a substrate. The mixture is then allowed to expand, with another piece of substrate placed on top of the expanded foam forming a sort of sandwich of substrate, foam, and substrate—an insulation panel.

The adjustable distributor 10 is usable to make an insulation panel that includes a top layer and a bottom layer. The top and bottom layers may each independently be those known in the art, such as metal (aluminum foils, aluminum sheets, steel sheets aluminum-copper sheets plasterboard, fiber glass, etc.). When using the adjustable distributor 10 in a continuous lamination process for manufacturing an insulation panel, the bottom face may be transported along a belt below the adjustable distributor 10 to allow for dispensing of a foam forming reactive on mixture on the bottom layer. The length of each plate stack 45 in the adjustable distributor 10 is customizable to optimize uniformity of the resultant foam layer by varying the number of plates 40 in each plate stack 45. The foam layer in the insulation panel is formed by dispensing the foam-forming reactive mixture through the adjustable distributor 10 onto the bottom layer.

The foam forming reactive mixture may rely on the presence of polyurethane/polyisocyanate polymers, which are the reaction product of an isocyanate moiety provided from an isocyanate component with an isocyanate-reactive moiety provided from an isocyanate-reactive component. The isocyanate component includes at least one isocyanate (e.g., a polyisocyanate and/or an isocyanate-terminated prepolymer). The isocyanate-reactive component includes at least a polyol component that includes one or more polyols. The isocyanate-reactive component and/or the isocyanate component may each independently include one or more optional additive components (such as a blowing agent, a fire barrier material, a filler, a catalyst, a curative agent, a chain extender, a flame retardant, a viscosity modifier, a pigment, a stabilizer, a surfactant, a plasticizer, a zeolite, moisture scavenger, and/or other additives that modify properties of the resultant final polyurethane product).

In exemplary embodiments, the isocyanate component may have one or more polyisocyanates and/or one or more of the isocyanate-terminated prepolymers. Exemplary polyisocyanates include toluene diisocyanate (TDI) and variations thereof known to one of ordinary skill in the art, and diphenylmethane diisocyanate (MDI) and variations thereof known to one of ordinary skill in the art.

The polyol component of the isocyanate-reactive component for forming the polyurethane layers may include one or more polyols. The polyol component may include one or more polyols selected from the group of a polyether polyol, a polyester polyol, a polycarbonate polyol, a natural-oil derived polyol, and/or a simple polyol (such as glycerin, ethylene glycol, polyethylene glycol, propylene glycol, polypropylene glycol, butylene glycol, etc.). Exemplary polyester polyols include aromatic polyester polyols. Other types of polyols may be used such as aliphatic polyester polyols, aliphatic or aromatic polyether-carbonate polyols, aliphatic or aromatic polyether-ester polyols, and polyols obtained from vegetable derivatives.

For forming the foam layer, the isocyanate-reactive component may be reacted with the isocyanate component at an isocyanate index from 70 to 2000. The isocyanate index is measured as the equivalents of isocyanate in the reactive mixture, divided by the total equivalents of isocyanate-reactive hydrogen containing materials in the reactive mixture, multiplied by 100.

Optional additive components may include one or more blowing agents, one or more fillers (such as fire barrier materials, oxides, ceramics, and other fillers known in the art), one or more catalysts, one or more curing agents, one or more chain extenders, one or more crosslinkers, one or more moisture scavengers, one or more dyes/pigments, one or more antioxidants, one or more UV stabilizers, one or more release agents, one or more adhesion promoters, one or more nucleating additives, and other additives known in the art. Optional additive components may be added via a dedicated stream or premixed in with one of the reactive components (e.g. the polyol).

Reinforcing fibers are also an additional, optional (yet useful), additive component in the making of PUR and/or PIR foam-based panels. Reinforcing fibers such as glass fibers, basalt fibers, carbon fibers, nylon fibers, and the like are useful in enhancing the mechanical properties of a final insulation panel. The fibers are typically positioned upon the bottom substrate during panel production and dispersed throughout the entire thickness of a panel by the growing foam created by a reactive mixture. The uniformity of mixture distribution (and resulting foam) that is achieved by the presently disclosed apparatus and methods is particularly important in the presence of these reinforcing fibers. This is because the reactive mixture which flows on to the bottom substrate and fibers does not easily self-level and/or distribute due to the presence these fibers. The presently disclosed apparatus and methods enable a uniform distribution of mixture which requires reduced self-leveling and/or distributing, generating more consistent fiber reinforced PUR and/or PIR foam insulation panels.

The embodiments disclosed above are in no way limiting and all elements from all sections of the application support the claimed subject matter herein.

EXAMPLES

Example 1

The distributor disclosed in this application may be utilized alone, or in series, or parallel to cover more surface area of a substrate with foaming mixture. In order to optimize such production, each outlet tube length and diameter must be calibrated. In one example, a test run was conducted by passing a liquid reactive mixture having a viscosity of 0.48 Pa s and density of 1200 kg/m³ through two distributors placed side by side. The overall width of the foam board was 1050 mm and the flowrate was 48 kg/min. The physical properties of the reactive mixture and the flowrate are used to calculate the needed outlet tube length at each hole position. In this example, a diameter of 4 mm was chosen for each outlet tube. In the chart below, the outlets are numbered as holes 1-12. These holes extend outward from the center of each distributor body for a total of 24 outlets on each distributor. The initial thickness in the table below refers to the thickness of the aluminum distributor body at the different positions, while final thickness is the final length of each outlet tube, comprised partially from the aluminum shell and partially from the plastic adjustment plates which, in this example are all a uniform 2 mm thick.

| Holes number [#] | Initial Thickness [mm] | Diameter [mm] | Calculated Tube Length [mm] | Number of plates [#] | Plates Thickness [mm] | Final Thickness [mm] |
| --- | --- | --- | --- | --- | --- | --- |
| 1 | 21 | 4 | 32.18 | 6 | 12 | 33 |
| 2 | 20 | 4 | 29.85 | 5 | 10 | 30 |
| 3 | 19 | 4 | 27.50 | 4 | 8 | 27 |
| 4 | 18 | 4 | 25.14 | 4 | 8 | 26 |
| 5 | 17 | 4 | 22.77 | 3 | 6 | 23 |
| 6 | 16 | 4 | 20.44 | 2 | 4 | 20 |
| 7 | 15 | 4 | 18.17 | 2 | 4 | 19 |
| 8 | 14 | 4 | 16.01 | 1 | 2 | 16 |
| 9 | 13 | 4 | 14.01 | 1 | 2 | 15 |

-continued

| Holes number [#] | Initial Thickness [mm] | Diameter [mm] | Calculated Tube Length [mm] | Number of plates [#] | Plates Thickness [mm] | Final Thickness [mm] |
|---|---|---|---|---|---|---|
| 10 | 12 | 4 | 12.27 | 1 | 2 | 14 |
| 11 | 11 | 4 | 10.88 | 0 | 0 | 11 |
| 12 | 10 | 4 | 10.00 | 0 | 0 | 10 |

Example 2

In this example, the outlet tube diameter was widened to 5 mm which decreased the rate at which the foaming mixture was poured onto the substrate below. The total number of plates and tube lengths required were then recalculated with the results obtained shown below.

| Holes number [#] | Initial Thickness [mm] | Diameter [mm] | Calculated Tube Length [mm] | Number of plates [#] | Plates Thickness [mm] | Final Thickness [mm] |
|---|---|---|---|---|---|---|
| 1 | 21 | 5 | 60.5 | 20 | 40 | 61 |
| 2 | 20 | 5 | 55.2 | 18 | 36 | 56 |
| 3 | 19 | 5 | 49.8 | 15 | 30 | 49 |
| 4 | 18 | 5 | 44.3 | 13 | 26 | 44 |
| 5 | 17 | 5 | 38.9 | 11 | 22 | 39 |
| 6 | 16 | 5 | 33.5 | 9 | 18 | 34 |
| 7 | 15 | 5 | 28.3 | 7 | 14 | 29 |
| 8 | 14 | 5 | 23.4 | 5 | 10 | 24 |
| 9 | 13 | 5 | 18.8 | 3 | 6 | 19 |
| 10 | 12 | 5 | 14.9 | 1 | 2 | 14 |
| 11 | 11 | 5 | 11.8 | 0 | 0 | 11 |
| 12 | 10 | 5 | 10.0 | 0 | 0 | 10 |

Example 3

In Example 3, the apparatus is used to create a higher density foam (210 kg/m$^3$) than 360 in Examples 1 and 2. To achieve such a result—the mixture discussed in Examples 1 and 2 would need to have its flowrate through the apparatus increased to 92 kg/min Based on past evidence, to keep bubbles from forming on top of the liquid mixture once poured on to a substrate, a constant liquid velocity at the end of the outlet tubes smaller than 0.7 m/s needs to be maintained. Given these factors, the outlet tubes diameter in Example 3 was increased to 7 mm

| Holes number [#] | Initial Thickness [mm] | Diameter [mm] | Calculated Tube Length [mm] | Number of plates [#] | Plates Thickness [mm] | Final Thickness [mm] |
|---|---|---|---|---|---|---|
| 1 | 21 | 7 | 214.96 | 97 | 194 | 215 |
| 2 | 20 | 7 | 191.70 | 86 | 172 | 192 |
| 3 | 19 | 7 | 168.39 | 75 | 150 | 169 |
| 4 | 18 | 7 | 145.21 | 64 | 128 | 146 |
| 5 | 17 | 7 | 122.40 | 53 | 106 | 123 |
| 6 | 16 | 7 | 100.24 | 42 | 84 | 100 |
| 7 | 15 | 7 | 79.10 | 32 | 64 | 79 |
| 8 | 14 | 7 | 59.44 | 23 | 46 | 60 |
| 9 | 13 | 7 | 41.86 | 14 | 28 | 41 |
| 10 | 12 | 7 | 27.10 | 8 | 16 | 28 |
| 11 | 11 | 7 | 16.09 | 3 | 6 | 17 |
| 12 | 10 | 7 | 10.00 | 0 | 0 | 10 |

As seen in these examples, depending on the production requirements of a given application of the disclosed apparatus—an estimate for the ideal outlet tube length can be readily calculated and then adjusted based on the properties of a foaming liquid mixture.

The invention claimed is:

1. An adjustable distributor apparatus for dispensing a foam forming mixture, the apparatus comprising:
   a main body and one or more adjustment plates, the main body featuring at least one inlet, one channel, and two or more outlets, the inlet, channel and outlets in fluid connection such that a fluid may pass through the inlet into the channel and exit from the channel through the outlets, and the outlets being coupled with the one or more adjustment plates, the two or more outlets of main body including a first outlet and a second outlet that are each independently coupled to at least one of the one or more adjustment plates,
   a first adjustment plate featuring at least a first face, a second face opposing the first face, and an outlet hole, the first face enabling a seal between the first adjustment plate and the outlet of the main body or a second adjustment plate, the first face of the first adjustment plate featuring a raised portion and the second face of the first adjustment plate featuring a relieved portion, the raised portion enabling the seal with the main body or the second adjustment plate, and the second adjustment plate featuring at least a first face, a second face opposing the first face, and an outlet hole, the outlet hole of the first adjustment plate extending from the first face to the second face of the first adjustment plate to the outlet hole of the first face and the second face of second adjustment plate by way of a fluid connection through the adjustment plates, wherein at least one of the one or more adjustment plates form a first plate stack and at least two of the one or more adjustment plates form a second plate stack, the first plate stack being in fluid connection with the first outlet and the second plate stack being in fluid connection with the second outlet, the first plate stack and second plate stack containing a different number of adjustment plates and the at least one of the one or more adjustment plates of the first plate stack being different from the at least two of the one or more adjustment plates of the second plate stack.

2. The apparatus of claim 1, wherein the first adjustment plate interlocks with the second adjustment plate, with a raised portion on the first face of the second adjustment plate forming a seal with the relieved portion of the second face of the first adjustment plate, wherein the first adjustment plate is coupled to a relieved portion on the main body.

3. The apparatus of claim 1, wherein at least one attachment point, separate from the seal between the main body outlet and first adjustment plate outlet hole, provides a connection between the main body and the first adjustment plate.

4. The apparatus of claim 1, wherein the diameter of the outlet holes in the first plate stack is different from the diameter of the outlet holes in the second plate stack.

5. The apparatus of claim 1, wherein the main body is comprised of an upper body portion and a lower body portion, the upper body portion and lower body portion being separable.

6. The apparatus of claim 1, wherein the apparatus dispenses a liquid polyurethane or polyisocyanurate foaming mixture to form a foam layer of an insulation panel or a foam board.

7. The apparatus of claim 1, wherein the adjustment plates are rectangular, circular, oval, square, oblong, rounded rectangular, diamond, or triangular in shape.

8. A method of producing an insulation panel or a foam board with the adjustable distributor as claimed in claim 1, the method comprising:
providing a bottom layer of the insulation panel; and
dispensing the foam-forming mixture through the adjustable distributor on to the bottom layer to form a foam layer of the insulation panel.

9. The apparatus of claim 1, wherein:
the adjustable distributor apparatus for dispensing the foam forming mixture is an adjustable poker for distribution of the foam forming mixture on a bottom substrate to form a foam layer on an insulation panel,
the foam forming mixture includes a polyurethane reactive mixture, and
lengths of the first and second plates stacks are independently adjustable based on changing a number of the one or more adjustment plates in the first and second plate stacks, respectively.

* * * * *